United States Patent
Rama et al.

(10) Patent No.: US 11,130,904 B2
(45) Date of Patent: Sep. 28, 2021

(54) GRAVEL PACKING FLUIDS WITH ENHANCED THERMAL STABILITY

(71) Applicant: Halliburton Energy Services, Inc., Houston, TX (US)

(72) Inventors: Mallikarjuna Shroff Rama, Pune (IN); Chetan Prakash, Pune (IN); Anant Kanhoba Ghumare, Nashik (IN); Sunil Narsingrao Garaje, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 183 days.

(21) Appl. No.: 15/553,108

(22) PCT Filed: Feb. 24, 2016

(86) PCT No.: PCT/US2016/019411
§ 371 (c)(1),
(2) Date: Aug. 23, 2017

(87) PCT Pub. No.: WO2016/153702
PCT Pub. Date: Sep. 29, 2016

(65) Prior Publication Data
US 2018/0037807 A1   Feb. 8, 2018

(30) Foreign Application Priority Data
Mar. 25, 2015   (IN) .............................. 824/DEL/2015

(51) Int. Cl.
*E21B 43/04* (2006.01)
*C09K 8/514* (2006.01)
(Continued)

(52) U.S. Cl.
CPC .......... *C09K 8/5758* (2013.01); *C04B 28/005* (2013.01); *C09K 8/514* (2013.01);
(Continued)

(58) Field of Classification Search
None
See application file for complete search history.

(56) References Cited

U.S. PATENT DOCUMENTS

| | | | |
|---|---|---|---|
| 4,220,566 A | | 9/1980 | Constien et al. |
| 4,458,753 A | * | 7/1984 | Philips .................. C09K 8/905 166/246 |

(Continued)

FOREIGN PATENT DOCUMENTS

| | | |
|---|---|---|
| WO | 2011100665 | 8/2011 |
| WO | 2011133627 | 10/2011 |
| WO | 2012121828 | 9/2012 |

OTHER PUBLICATIONS

International Search Report and Written Opinion for PCT/US16/19411 dated Sep. 29, 2016.
(Continued)

*Primary Examiner* — Charles R Nold
(74) *Attorney, Agent, or Firm* — Thomas Rooney; C. Tumey Law Group PLLC

(57) ABSTRACT

Systems and methods for using gellable gravel packing fluids that may comprise polysaccharide gelling agents and gel stabilizers to extend the working temperature range for the polysaccharide gelling agents. A method for placing a gravel pack in a subterranean formation comprising: providing a gravel packing fluid in the form of a linear gel and comprising an aqueous base fluid, a polysaccharide gelling agent, a thermal stabilizer, and a gravel; placing the gravel packing fluid into the subterranean formation; and allowing the gravel packing fluid to form a gravel pack in the subterranean formation.

20 Claims, 2 Drawing Sheets

(51) Int. Cl.
  *C09K 15/18* (2006.01)
  *C09K 15/20* (2006.01)
  *C09K 8/575* (2006.01)
  *C04B 28/00* (2006.01)

(52) U.S. Cl.
  CPC .............. *C09K 15/18* (2013.01); *C09K 15/20* (2013.01); *E21B 43/04* (2013.01); *C09K 2208/26* (2013.01)

(56) References Cited

U.S. PATENT DOCUMENTS

| | | | | |
|---|---|---|---|---|
| 5,566,759 | A * | 10/1996 | Tjon-Joe-Pin | C09K 8/514 166/300 |
| 2005/0090406 | A1 * | 4/2005 | McCabe | C09K 8/90 507/211 |
| 2006/0014648 | A1 | 1/2006 | Milson et al. | |
| 2006/0041028 | A1 | 2/2006 | Crews | |
| 2007/0087941 | A1 * | 4/2007 | Cawiezel | C09K 8/68 507/204 |
| 2007/0218150 | A1 | 9/2007 | Akashi et al. | |
| 2007/0256836 | A1 | 11/2007 | Welton et al. | |
| 2008/0128281 | A1 | 6/2008 | Blikstad et al. | |
| 2008/0227672 | A1 * | 9/2008 | Crews | C09K 8/68 507/260 |
| 2009/0023613 | A1 | 1/2009 | Li et al. | |
| 2010/0010106 | A1 | 1/2010 | Crews | |
| 2011/0030952 | A1 | 2/2011 | Huang et al. | |
| 2013/0098618 | A1 | 4/2013 | Braganza et al. | |
| 2013/0118740 | A1 | 5/2013 | Sherman et al. | |
| 2013/0118744 | A1 | 5/2013 | Gamage et al. | |
| 2015/0072902 | A1 * | 3/2015 | Lafitte | C09K 8/035 507/112 |

OTHER PUBLICATIONS

"Aqualinear® HT High Temperature Gravel Pack Fluid Service" from Halliburton. Dated 2012.

"Aqualinear™ Gravel Pack Fluid Service" from Halliburton. Dated 2005.

1st Australian Examination Report for Application No. 2016235950 dated Nov. 17, 2017.

* cited by examiner

GRAVEL PACKING FLUIDS WITH ENHANCED THERMAL STABILITY

BACKGROUND

This invention relates to gravel packing fluids with enhanced thermal stability for use in subterranean operations. More specifically, the invention relates to gellable gravel packing fluids that may comprise polysaccharide gelling agents and gel stabilizers to extend the working temperature range for the polysaccharide gelling agents.

Gravel packing operations are a type of subterranean operation. Typically a gravel packing operation may be used to reduce the migration of unconsolidated formation particulates into a well bore. During gravel packing operations, gravel such as sand/proppant may generally be carried to a well bore by a gravel packing fluid, which may be gelled to increase its viscosity and improve its ability to carry gravel. The gravel packing fluid may be pumped into a well bore in which the gravel pack is to be placed. The base fluid of the gravel packing fluid may leak off into the subterranean zone and/or return to the surface while the gravel is left in the zone to form a gravel pack. The resultant gravel pack may act as a filter to separate formation sands from produced fluids while permitting the produced fluids to flow into the wellbore. Typically, gravel pack operations may involve placing a gravel pack screen in the wellbore and packing the surrounding annulus between the screen and the wellbore with gravel designed to prevent the passage of formation sands through the pack. Such gravel packs may be used to stabilize the formation while causing minimal impairment to well productivity. Screenless gravel packing operations may also be performed.

Gravel packing fluids used in gravel packing operations may typically be a gel formed by viscosifying aqueous-based fluids (e.g., a brine) with a gelling agent, inter alia, to improve its ability to carry gravel. One example of a common gelling agent includes polysaccharide gelling agents, such as xanthan and diutan. At elevated temperatures, however, the viscosity of the gravel packing fluids that use the polysaccharide gelling agents may be diminished. For example, the gelled gravel packing fluids may break into lower viscosity fluids before their intended downhole function is completed. If the gravel starts to settle out of the gravel packing fluid before completion of the operation, the gravel packing operation may be unsuccessful leaving an incomplete and/or improper gravel pack. The premature breaking of gelled gravel packing fluids can be particularly problematic in high temperature subterranean formations, where the elevated formation temperature decreases the gel stability and accelerates gel decomposition. Due to premature breakage, xanthan gelling agents may be limited to formations having bottom hole static temperatures ("BHST") of about 220° F. or lower, while diutan gelling agents may be limited to BHST's of about 270° F. or lower.

As subterranean operations are being conducted in deeper wellbores having ever higher formation temperatures, the issues with long-term gel stability are becoming an increasingly common issue as existing gels are being pushed to their chemical and thermal stability limits.

BRIEF DESCRIPTION OF THE DRAWINGS

These drawings illustrate certain aspects of some examples of the present invention, and should not be used to limit or define the invention.

DETAILED DESCRIPTION

Figure 1:
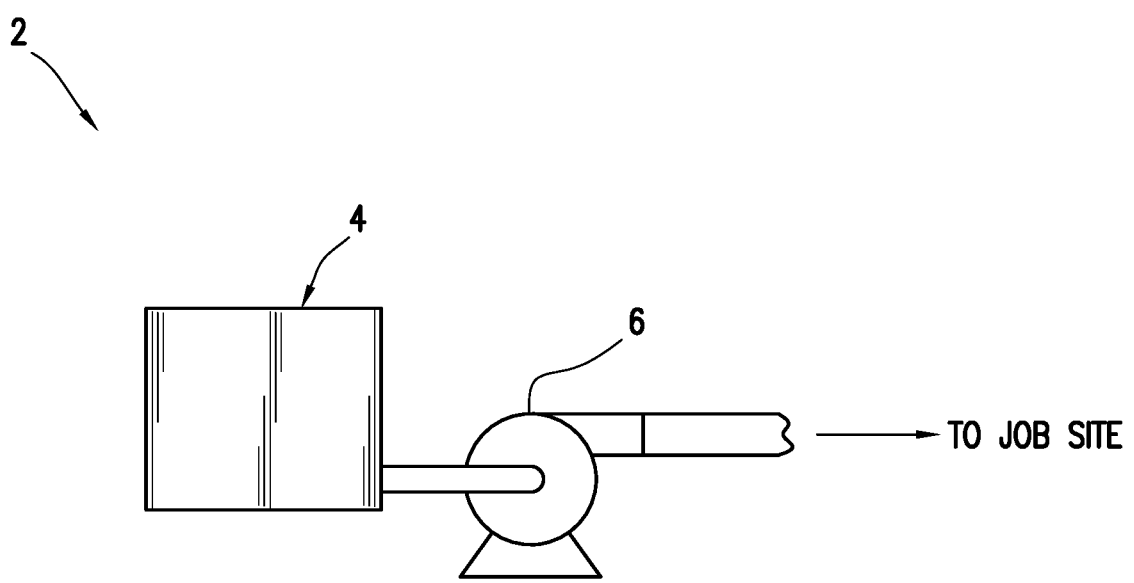
FIG. 1 is a schematic diagram of an example system for preparation of a gravel packing fluid.

Provided are compositions and methods of use for gravel packing fluids in subterranean operations, and, more specifically, using gellable gravel packing fluids comprising polysaccharide gelling agents and gel stabilizers to extend the working temperature range for the polysaccharide gelling agents. The gravel packing fluids may comprise an aqueous base fluid. The gravel packing fluids may comprise a polysaccharide gelling agent and a thermal stabilizer. The gravel packing fluids may be stable in formations having bottom hole static temperatures up to 350° F. The gravel packing fluids may inhibit some crosslinkers, for example, the gravel packing fluids may inhibit ferric ion crosslinking. The gravel packing fluids may be free or essentially free of crosslinkers. The gravel packing fluids may be free or essentially free of sulfur. The gravel packing fluids may be used in wellbore operations of subterranean formations having bottom hole static temperatures that are prohibitive for use of polysaccharide gelling agents without thermal stabilizers.

The gravel packing fluids disclosed herein may be linear gels that comprise an aqueous base fluid, a polysaccharide gelling agent, a thermal stabilizer, and a prepared gravel of a specific size. Linear gels provide superior gravel packing to crosslinked gels, and may not incur the pumping problems that can affect crosslinked gels, or other highly viscous fluids pumped at low pressure with low shear rates. Further, linear gels may be used with shunt tubes, without limitation, this may be because shunt tubes can be narrow and thus crosslinked gels or highly viscous fluids may cause more friction and potentially damage equipment. Additionally, gravel packing jobs are typically performed at low shear rates with a low pressure (e.g., below fracture pressure), and in such conditions, linear gels are able to sufficiently suspend gravel at the desired capacity. Also, and without limitation, linear gels may perform better in horizontal wells for the suspension of gravel and may be easier to pump to a desired location in such operations. In optional examples, gel stabilizers and/or gel breakers may be used. In further optional examples, the gravel packing fluids may be free or substantially free of added crosslinkers, for example, metal ions such as ferric ions, titanium (IV) ions, cobalt (III) ions, and the like; with the potential exception of any crosslinkers which may contact the gravel packing fluids while in use, for example, metal ions native to or disposed within a subterranean formation. In further optional examples, the gravel packing fluids may be free or substantially free of sulfur. The linear gravel packing fluid may have a viscosity of about 5 centipoise to about 1000 centipoise at a shear of 511 sec-1, or about 10 centipoise to about 800 centipoise at a shear of 511 sec-1, or about 10, 15, 20, 25, 30, 35, 40, 45, 50, 55, 60, 65, 70, 75, 80, 85, 90, 95, 100, 200, 300, 500, 700, 900 centipoise at a shear of 511 sec-1.

The gravel packing fluids disclosed herein may comprise an aqueous base fluid. The aqueous base fluid may be from any source. In various examples, the aqueous base fluid may comprise fresh water, acidified water, salt water, seawater, brine, or an aqueous salt solution. In some examples, the aqueous base fluid can comprise a monovalent brine or a divalent brine. Suitable monovalent brines may include, for example, sodium chloride brines, sodium bromide brines, potassium chloride brines, potassium bromide brines, and the like. Suitable divalent brines may include, for example, magnesium chloride brines, calcium chloride brines, calcium bromide brines, and the like. In some examples, the aqueous base fluid may be a high density brine. As used herein, the term "high density brine" refers to a brine that has a density of about 8.33 lbs/gal to about 19.2 lb/gal or greater.

As discussed above, the gravel packing fluids may comprise a polysaccharide gelling agent. Suitable polysaccharide gelling agents may include xanthan, scleroglucan, diutan, succinoglycan, guar, hydroxyethylcellulose, and modifications, derivatives, and combinations thereof. The polysaccharide gelling agent may be present in the gravel packing fluids in an amount in the range of from about 10 lb/Mgal to about 300 lb/Mgal, alternatively about 25 lb/Mgal to about 100 lb/Mgal, or about 50 lb/Mgal, 75 lb/Mgal, 150 lb/Mgal, 200 lb/Mgal, or 250 lb/Mgal. With the benefit of this disclosure one of ordinary skill in the art should be able to determine a type and amount of polysaccharide gelling agent for use in a desired application.

The gravel packing fluids may comprise a thermal stabilizer. The thermal stabilizers may comprise one or more non-sulfur antioxidants that increase the thermal stability of the polysaccharide gelling agent. The thermal stabilizers may include, for example, ascorbic acid, any salt of ascorbic acid (e.g., sodium ascorbate), erythorbic acid, any salt of erythorbic acid (e.g., sodium erythorbate), tocopherol, any derivative thereof; and any combination thereof. The thermal stabilizers may be included in the gravel packing fluids in an amount in a range of about 5 lb/Mgal to about 300 lb/Mgal, alternatively about 10 lb/Mgal to about 50 lb/Mgal, alternatively about 25 lb/Mgal to about 100 lb/Mgal, or about 150 lb/Mgal, 200 lb/Mgal, or 250 lb/Mgal. Without limitation by theory, the thermal stabilizers may function by removing oxygen radicals from the gravel packing fluids. Oxygen radicals may break the ether linkages of the polysaccharide gelling agents. At higher temperatures, the prevalence of oxygen radicals may be increased, leading to acceleration in the breakdown of the polysaccharide gelling agents. In contrast to antioxidants that contain sulfur and may be subject to environmental regulations, the non-sulfur antioxidants may not damage the environment and thus, their use may be allowed in locations that are subject to strict environmental regulations, such as the North Sea, Gulf of Mexico, etc. With the benefit of this disclosure one of ordinary skill in the art should be able to determine a type and amount of thermal stabilizer for use in a desired application.

To further increase temperature stability, the thermal stabilizers may be optionally combined with an antioxidant stabilizer. Examples of antioxidant stabilizers may include hydroxylamines, for example, alkylhydoxylamines such as isopropylhydroxylamine. The antioxidant stabilizers may have a molecular weight of less than about 400. When used, a ratio of the antioxidant stabilizers to the thermal stabilizers may range, for example, between about 1:1 and about 3:1. The antioxidant stabilizers may be included in the gravel packing fluids in an amount in a range of about 2 lb/Mgal to about 100 lb/Mgal, alternatively about 5 lb/Mgal to about 25 lb/Mgal, alternatively about 10 lb/Mgal to about 20 lb/Mgal, or about 50 lb/Mgal, 70 lb/Mgal, or 90 lb/Mgal. Without limitation by theory, it is believed that the antioxidant stabilizers may increase the effective working temperature range of the thermal stabilizers, thus allowing the thermal stabilizers to stabilize the polysaccharide gelling agents at higher temperatures. With the benefit of this disclosure one of ordinary skill in the art should be able to determine a type and amount of antioxidant stabilizer for use in a desired application.

The gravel packing fluids may comprise a gravel. As used herein, "gravel" may be any particulate manner used to filter sand or other similar particulate solids from the production fluid or other such produced fluids. Examples of gravel may include, sand, ceramics, any type of proppant, or any type of sized solid particulate. Optionally, the gravel may be used with a screen to aid in filtration if desired, as well as to assist in placement of the gravel in loosely consolidated or unconsolidated formations. The gravel may be pre-sized to a specific desirable size. If a screen is used, the gravel may be sized at a size greater than the screen apertures. The gravel may have a size in the range of about 0.0083 inch to about 0.0661 inch. Alternatively, the gravel may have a size of 12/18, 16/30, 20/40, 30/50, or 40/70 US mesh. The gravel may be included in the gravel packing fluids in an amount of in a range of about 0.5 pounds added per gallon to about 10 pounds added per gallon, alternatively about 1 pound added per gallon to about 7 pounds added per gallon, alternatively about 2 pounds added per gallon to about 4 pounds added per gallon, or about 6 pounds added per gallon, 7 pounds added per gallon, or 8 pounds added per gallon. The gravel may be carried to a subterranean formation location wherein filtration (e.g., sand control) is needed via the gravel packing fluid and placed in said location. If the gravel packing fluids do not possess a sufficient viscosity and/or break prematurely, the gravel may settle out of the gravel packing fluids and a gravel pack may not be formed. With the benefit of this disclosure one of ordinary skill in the art should be able to determine a type, amount, and size of gravel for use in a desired application.

In optional examples, a gel breaker may be added to the gravel packing fluids when it is desirable to break the gravel packing fluids. In some example, the gel breaker may be added to the gravel packing fluids within a separate fluid. A wide variety of suitable gel breakers are well known to one having ordinary skill in the art. Examples of which include, but are not limited to oxidizers such as sodium bromate, sodium chlorate, or manganese dioxide. In other examples the breaker can comprise a treatment fluid having a pH of about 7 or greater, which may cause the gelled gravel packing fluids to break. In some examples, the gel breaker may be present in the gravel packing fluid as a delayed-release gel breaker. For example, a gel breaker may be prepared for delayed release by encapsulating the gel breaker in a material that is slowly soluble or slowly degradable in the gravel packing fluid or the gel formed therefrom. Examples of encapsulation materials may include, for example, porous materials (e.g., precipitated silica, alumina, zeolites, clays, hydrotalcites, and the like), EPDM rubber, polyvinylidene chloride, polyamides, polyurethanes, crosslinked and partially hydrolyzed acrylate polymers, and the like. In some examples, degradable polymers can be used to encapsulate a gel breaker. The gel breaker may be included in the gravel packing fluids in an amount in a range of about 0.001% to about 0.5% by volume of the gravel packing fluids, alternatively about 0.01% to about 0.3% by volume of the gravel packing, or further alternatively, about 0.1% to about 0.2% by volume of the gravel packing. With the benefit of this disclosure one of ordinary skill in the art should be able to determine a type and amount of gel breaker for use in a desired application.

In optional examples, the gravel packing fluids may comprise a non-emulsifier, or any such additive used to control emulsion formation in the gravel packing fluids.

Examples of non-emulsifiers may include, but are not limited to ionic and nonionic surfactants, foaming agents, and the like. Commercial examples of non-emulsifiers include NEA-96M™ surfactant, PEN-5M™ foaming agent, and LoSurf-300M™ surfactant, all available from Halliburton Energy Services, Inc. of Houston, Tex. The non-emulsifiers may be included in the gravel packing fluids in an amount in a range of about 0.1% v/v to about 10% v/v. For example, the non-emulsifiers may be included in the gravel packing fluids in an amount in a range of about 1% v/v to about 9% v/v, alternatively about 2% v/v to about 8% v/v, or further alternatively, about 3% v/v, about 4% v/v, about 5% v/v, about 6% v/v, or about 7% v/v. With the benefit of this disclosure one of ordinary skill in the art should be able to determine a type and amount of non-emulsifier for use in a desired application.

In optional examples, the gravel packing fluids may comprise an iron control agent, or any such additive used to reduce the precipitation of iron. Examples of iron control agents may include reducing agents and chelates; specific examples may include but are not limited to citric acid, sodium citrate, potassium citrate, acetic anhydride. The iron control agents may be included in the gravel packing fluids in an amount in a range of about 0.01% w/v to about 1% w/v. For example, the iron control agents may be included in the gravel packing fluids in an amount in a range of about 0.1% w/v to about 0.9% w/v, alternatively about 0.2% w/v to about 0.8% w/v, or further alternatively, about 0.3% w/v, about 0.4% w/v, about 0.5% w/v, about 0.6% w/v, or about 0.7% w/v. With the benefit of this disclosure one of ordinary skill in the art should be able to determine a type and amount of iron control agent for use in a desired application.

As discussed above, the gravel packing fluids may be used in a subterranean formation having a bottom hole static temperature of up to about 350° F. For example, the gravel packing fluids may be used in a subterranean formation having a bottom hole static temperature of up to about 325° F. Alternatively, the gravel packing fluids may be used in a subterranean formation having a bottom hole static temperature of up to about 300° F. Further alternatively, the gravel packing fluids may be used in a subterranean formation having a bottom hole static temperature of up to about 275° F. By way of example, the gravel packing fluids may be used in subterranean formations having a bottom hole static temperature of from about 275° F. to about 350° F. With the benefit of this disclosure one of ordinary skill in the art should be able to produce a gravel packing fluid for use in a subterranean formation with a bottom hole static temperature up to about 350° F.

Those of ordinary skill in the art will appreciate that the gravel packing fluids generally should have a density suitable for a particular application. By way of example, the gravel packing fluids may have a density in the range of from about 8 pounds per gallon ("lb/gal") to about 20 lb/gal. In certain examples, the gravel packing fluids may have a density in the range of from about 10 lb/gal to about 17 lb/gal. Those of ordinary skill in the art, with the benefit of this disclosure, will recognize the appropriate density for a particular application.

The gravel packing fluids disclosed herein may be free of or essentially free of crosslinkers. Examples of crosslinkers may include, but are not limited to metal ions such as titanium (IV) ions, zirconium (IV) ions, chromium (III) ions, cobalt (III) ions, aluminum (III) ions, hafnium (III) ions, and the like; as well as metal ion-releasing compounds such as coordination compounds; organic crosslinkers such as diamines, dithiols, or diols; organic polymers such as polyesters, polyalkyleneimines (e.g., polyethyleneimine), or polyalkylenepolyamines. In some examples, the gravel packing fluids may encounter crosslinkers within a subterranean formation, said crosslinkers being present in the subterranean formation previously as either a native component of the subterranean formation or being introduced by a prior pumped fluid. In these examples the gravel packing fluids may be free or substantially free of "added" crosslinkers, wherein "added" is defined as the addition of crosslinkers to the gravel packing fluids during preparation of the gravel packing fluids and prior to introduction of the gravel packing fluids in the subterranean formation.

A method for placing a gravel pack in a subterranean formation may comprise: providing a gravel packing fluid in the form of a linear gel and comprising an aqueous base fluid, a polysaccharide gelling agent, a thermal stabilizer, and a gravel; placing the gravel packing fluid into the subterranean formation; and allowing the gravel packing fluid to form a gravel pack in the subterranean formation. The aqueous base fluid may comprise a monovalent or divalent brine. The polysaccharide gelling agent may comprise a polysaccharide gelling agent selected from the group consisting of xanthan, scleroglucan, diutan, succinoglycan, guar, hydroxyethyl cellulose, and combinations thereof. The thermal stabilizer may be selected from the group consisting of ascorbic acid, salts of ascorbic acid, erythorbic acid, salts of erythorbic acid, tocopherol, and combinations thereof. The thermal stabilizer may be present in the gravel packing fluid in an amount of about 5 lb/Mgal to about 300 lb/Mgal. The gravel may comprise sand. The gravel packing fluid may further comprise an antioxidant stabilizer, wherein the antioxidant stabilizer comprises a hydroxylamine. The gravel packing fluid may further comprise a gel breaker. The gravel packing fluid may be essentially free of added crosslinkers. The bottom hole static temperature of the subterranean formation may be greater than 200° F.

A gravel packing fluid may comprise: an aqueous base fluid, a polysaccharide gelling agent, a thermal stabilizer, and a gravel. The aqueous base fluid may comprise a monovalent or divalent brine. The polysaccharide gelling agent may comprise a polysaccharide gelling agent selected from the group consisting of xanthan, scleroglucan, diutan, succinoglycan, guar, hydroxyethyl cellulose, and combinations thereof. The thermal stabilizer may be selected from the group consisting of ascorbic acid, salts of ascorbic acid, erythorbic acid, salts of erythorbic acid, tocopherol, and combinations thereof. The thermal stabilizer may be present in the gravel packing fluid in an amount of about 5 lb/Mgal to about 300 lb/Mgal. The gravel may comprise sand. The gravel packing fluid may further comprise an antioxidant stabilizer, wherein the antioxidant stabilizer comprises a hydroxylamine. The gravel packing fluid may further comprise a gel breaker. The gravel packing fluid may be essentially free of added crosslinkers.

A gravel packing system may comprise: a gravel packing fluid comprising an aqueous base fluid, a polysaccharide gelling agent, a thermal stabilizer, and a gravel; a production tubing; a screen coupled to the production tubing; and a pumping system fluidically coupled to the production tubing, wherein the pumping system is capable of pumping the gravel packing fluid through the production tubing. The polysaccharide gelling agent may comprise a polysaccharide gelling agent selected from the group consisting of xanthan, scleroglucan, diutan, succinoglycan, guar, hydroxyethyl cellulose, and combinations thereof. The thermal stabilizer may be selected from the group consisting of ascorbic acid, salts of ascorbic acid, erythorbic acid, salts of erythorbic acid, tocopherol, and combinations thereof. The thermal stabilizer may be present in the gravel packing fluid in an amount of about 5 lb/Mgal to about 300 lb/Mgal. The gravel may comprise sand. The gravel packing fluid may further comprise an antioxidant stabilizer, wherein the antioxidant stabilizer comprises a hydroxylamine. The gravel packing fluid may further comprise a gel breaker. The gravel packing fluid may be essentially free of added crosslinkers.

Referring now to FIG. 1, the preparation of a gravel packing fluid in accordance with the examples described herein will now be described. FIG. 1 illustrates a system 2 for the preparation of a gravel packing fluid and subsequent delivery of the gravel packing fluid to a location within a subterranean location. As shown, the gravel packing fluid may be mixed in mixing equipment 4, such as a jet mixer, re-circulating mixer, or a batch mixer, for example, and then pumped via pumping equipment 6 to the cementing application site. Mixing equipment 4 may be used to mix the aqueous base fluid, the polysaccharide gelling agent, the thermal stabilizer, and the gravel. In optional embodiments, the mixing equipment 4 may be used to also mix an antioxidant stabilizer with the gravel packing fluid. In some embodiments, a jet mixer may be used, for example, to continuously mix the gravel with the aqueous base fluid as it is being pumped to the wellbore. Additionally, batch mixer type units for the gravel packing fluid may be plumbed in line with a separate tank containing one or more additives. In some examples, mixing equipment 4 may be coupled to pumping equipment 6.

Figure 2:
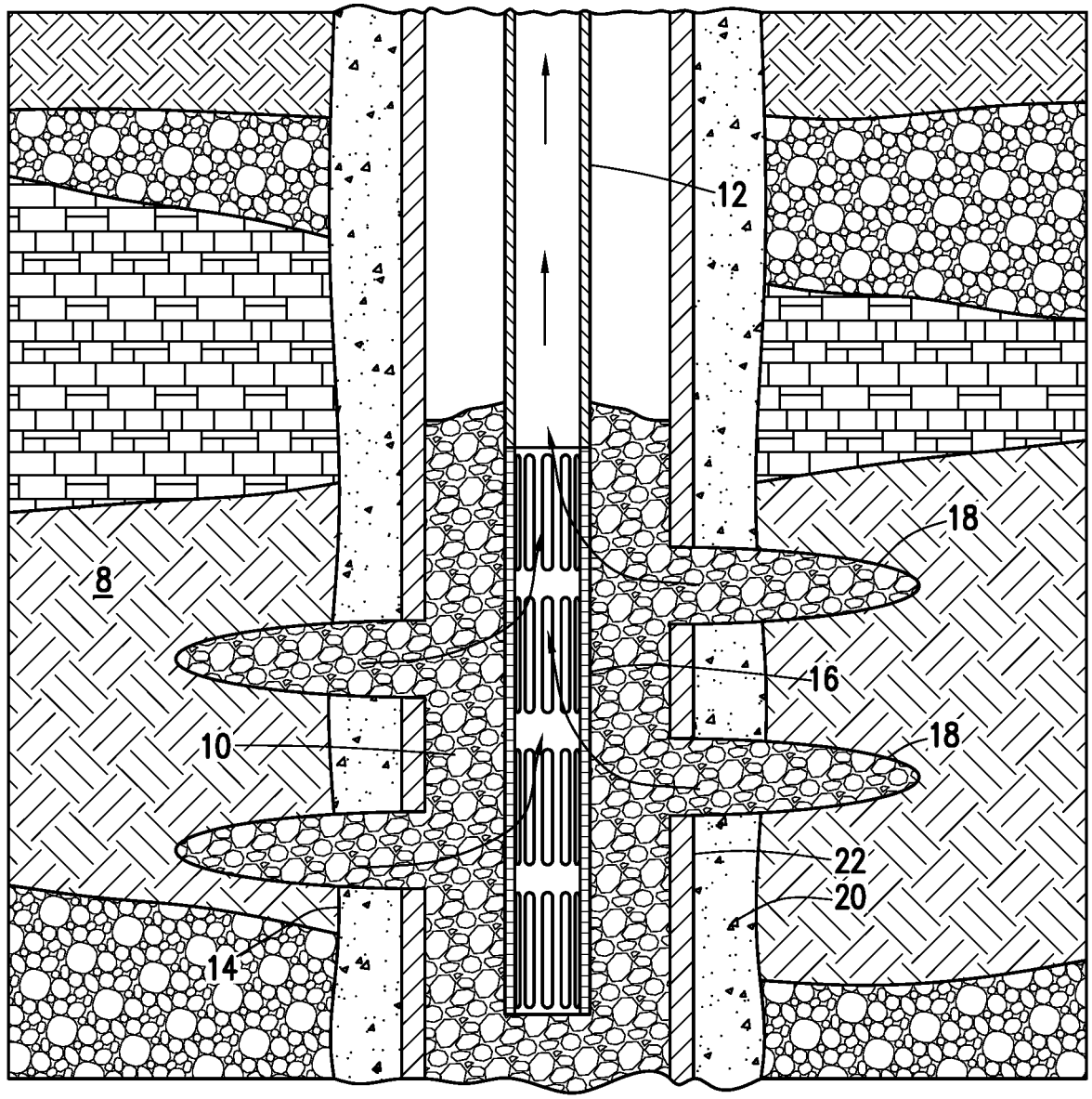
FIG. 2 is a schematic diagram illustrates a placed gravel pack within a subterranean formation.

As illustrated in FIG. 2, subterranean formation 8 may produce sand which may reduce or block flow of producing fluids. In a subterranean formation 8 which produces sand or other undesirable solids, a gravel packing fluid may be used to filter the sand from any produced fluids. FIG. 2 illustrates a gravel pack 10, comprising gravel that has been pre-sized to a specific size. Gravel pack 10 has been placed into a targeted area within a subterranean formation 8. The gravel pack 10 was placed using a gravel packing fluid as described herein. For example, the gravel packing fluids described herein may be mixed with mixing equipment 4, and then pumped into the production tubing 12 within the wellbore 14 of the subterranean formation 8 by pumping equipment 6 (as shown in FIG. 1). As illustrated a gravel pack 8 may then be placed into a specific target area of the subterranean formation 8. This may be accomplished by pumping the gravel packing fluid to the specific target area and breaking the gravel packing fluid (e.g., with a gel breaker) and/or leaving the gravel packing fluid in the specific target area until it breaks and/or the gravel settles out of the gravel packing fluid. The remaining components of the gravel packing fluid may then disperse into the subterranean formation 8 and/or be pumped back to the surface. It is to be understood that that it is important to select components which do not damage the subterranean formation 8 should any of the remaining components of the gravel packing fluid disperse into the subterranean formation 8.

As discussed above, the gravel packing fluids disclosed herein allow for placement of a gravel pack 10 in subterranean formations 8 with bottom hole static temperatures of up to about 350° F. This is accomplished by the gravel packing fluids comprising thermal stabilizers as disclosed herein. As illustrated by FIG. 2, once the gravel pack is in place, a screen 16 may be inserted at the bottom of the production tubing 12. The screen 16 may be optional. Screen 16 may be a wire-wrapped screen and may aid in the filtration of sand or other solids from any of the produced fluids. Once the gravel pack 10 is in place, produced fluids may flow out of the subterranean formation 8 and through perforations 18 in the cement 20 and casing 22. The produced fluids may have sand or any other type of solid, filtered out of the produced fluids by the gravel pack 8. The produced fluids may flow through screen 16, should optional screen 16 be in place, and into production tubing 12 where the produced fluids may be pumped to the surface and collected.

The exemplary gravel packing fluids disclosed herein may directly or indirectly affect one or more components or pieces of equipment associated with the preparation, delivery, recapture, recycling, reuse, and/or disposal of the disclosed gravel packing fluids. For example, the disclosed gravel packing fluids may directly or indirectly affect one or more mixers, related mixing equipment, mud pits, storage facilities or units, composition separators, heat exchangers, sensors, gauges, pumps, compressors, and the like, used to generate, store, monitor, regulate, and/or recondition the exemplary gravel packing fluids. The disclosed gravel packing fluids may also directly or indirectly affect any transport or delivery equipment used to convey the gravel packing fluids to a well site or downhole such as, for example, any transport vessels, conduits, pipelines, trucks, tubulars, and/or pipes used to compositionally move the gravel packing fluids from one location to another, any pumps, compressors, or motors (e.g., topside or downhole) used to drive the gravel packing fluids into motion, any valves or related joints used to regulate the pressure or flow rate of the gravel packing fluids, and any sensors (i.e., pressure and temperature), gauges, and/or combinations thereof, and the like. The disclosed gravel packing fluids may also directly or indirectly affect the various downhole equipment and tools that may come into contact with the gravel packing fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the disclosure, the following examples of certain aspects of some embodiments are given. In no way should the following examples be read to limit, or define, the entire scope of the embodiments.

Example 1

The following series of tests were performed to evaluate the rheology of comparative gravel packing fluids comprising a thermal stabilizer. Four different comparative sample gravel packing fluids, designated Samples 1-4, were prepared using at least some of the following components as indicated in Table 1 below.

TABLE 1

Sample Formulations

| Component | Function | Sample 1 | Sample 2 | Sample 3 | Sample 4 |
|---|---|---|---|---|---|
| 9.2 ppg NaBr Brine | Base Fluid | — | — | — | — |
| Glutaraldehyde (gal/Mgal) | Biocide | 0.12 | 0.12 | 0.12 | 0.12 |
| Diutan (lb/Mgal) | Gelling Agent | 70 | 70 | 80 | 80 |
| Sodium Citrate (lb/Mgal) | Iron Control | 12 | 12 | 12 | 12 |
| Sodium Erythrobate (lb/Mgal) | Thermal Stabilizer | 0 | 30 | 0 | 30 |

After preparation, the viscosity (cP) of the five samples was determined at 310° F. using a Chandler Engineering® Model 5550 HTHP Viscometer at 511 sec$^{-1}$ with B1 bob and R1 rotor under nitrogen pressure. The data is presented in Table 2 below. The Chandler Engineering® Model 5550 HTHP Viscometer is available from Chandler Engineering® of Broken Arrow, Okla.

TABLE 2

Viscosity Tests

Viscosity (cP) of diutan gel in 9.2 ppg NaBR brine at 511 s$^{-1}$

| Elapsed Time (min.) | Sample 1: 70 lb/Mgal - No Thermal Stabilizer | Sample 2: 70 lb/Mgal - With Thermal Stabilizer | Sample 3: 80 lb/Mgal - No Thermal Stabilizer | Sample 4: 80 lb/Mgal - With Thermal Stabilizer |
|---|---|---|---|---|
| 0 | 66 | 68 | 80 | 81 |
| 20 | 67 | 73 | 85 | 87 |
| 40 | 68 | 74 | 88 | 89 |
| 50 | 55 | 74 | 79 | 87 |
| 60 | 48 | 73 | 76 | 87 |
| 80 | 41 | 67 | 67 | 83 |
| 100 | 22 | 59 | 60 | 75 |
| 110 | 16 | 56 | 51 | 70 |
| 120 | — | 55 | 46 | 67 |
| 140 | — | — | 37 | 60 |
| 160 | — | — | 29 | 52 |
| 170 | — | — | 20 | 47 |
| 180 | — | — | 9 | 43 |

Example 1 thus indicates that the addition of a thermal stabilizer to a polysaccharide gelling agent increases the stability of the polysaccharide gelling agent at high temperatures.

Example 2

Sand settling tests were performed on the formulations identified as Samples 1 and 2 as described above, such Samples having a density of 70 lb/Mgal. For these tests, a slurry of sand and 16/30 CARBOLITE proppant (at 4 pounds of proppant added per gallon) was filled in a marked glass liner, and then the liner was transferred to an autoclave and heated under nitrogen pressure to reach the testing temperature of 310° F. CARBOLITE proppant is available from Carbo Ceramics of Houston, Tex. After the test temperature was reached, the sample was cooled for 10 minutes and depressurized. The glass liner was then removed and the level of settled sand was noted.

TABLE 3

Settled Sand

| Gravel Packing Fluid | Percent of sand settling in 30 minutes |
|---|---|
| 70 lb/Mgal diutan gel without thermal stabilizer | 28% |
| 70 lb/Mgal diutan gel with 30 lb/Mgal thermal stabilizer | 12% |

As shown, the presence of a thermal stabilizer reduces sand settling at elevated temperatures, therefore illustrating that the thermal stabilizer improves the fluid suspension of gravel in gravel packing fluids comprising polysaccharide gelling agents.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for placing a gravel pack in a subterranean formation comprising:
providing a gravel packing fluid in the form of a linear gel and comprising an aqueous base fluid, a single polysaccharide gelling agent, a thermal stabilizer comprising sodium erythorbate, a biocide, comprising glutaraldehyde, an iron control, and a gravel;
placing the gravel packing fluid into the subterranean formation; and
allowing the gravel packing fluid to form a gravel pack in the subterranean formation;
wherein the gravel packing fluid contains no other polysaccharide other than the single polysaccharide; wherein the gravel packing fluid comprising the thermal stabilizer reduces the percent of sand settling by at least 50% less than a gravel packing fluid without the thermal stabilizer in 30 minutes; and wherein the subterranean formation has a bottom hole static temperature of greater than 275° F.

2. The method of claim 1, wherein the polysaccharide gelling agent comprises a polysaccharide gelling agent selected from the group consisting of diutan, succinoglycan, hydroxyethyl cellulose, and combinations thereof.

3. The method of claim 1, wherein the gravel comprises sand.

4. The method of claim 1, wherein the gravel packing fluid further comprises an antioxidant stabilizer, and wherein the antioxidant stabilizer comprises a hydroxylamine.

5. The method of claim 1, wherein the gravel packing fluid further comprises a gel breaker that is encapsulated and comprises sodium bromate, sodium chlorate, or manganese dioxide.

6. The method of claim 1, wherein the gravel packing fluid is essentially free of added crosslinkers, wherein the gravel packing fluid further comprises a gel breaker comprising a treatment fluid having a pH of 7 or greater.

7. The method of claim 1, wherein the bottom hole static temperature of the subterranean formation is from about 275° F. to about 350° F.

8. The method of claim 1, wherein the polysaccharide gelling agent is present in the gravel packing fluid in an amount of about 50 lb/Mgal to about 100 lb/Mgal.

9. The method of claim 1, wherein the thermal stabilizer is present in the gravel packing fluid in an amount of about 10 lb/Mgal to about 50 lb/Mgal.

10. The method of claim 1, wherein the iron control comprises sodium citrate.

11. The method of claim 1 wherein the gravel packing fluid has a viscosity of about 5 centipoise to about 1000 centipoise at a shear of 511 sec-1.

12. A gravel packing fluid comprising:
an aqueous base fluid,
a single polysaccharide gelling agent, wherein the polysaccharide gelling agent is present in the gravel packing fluid in an amount of about 50 lb/Mgal to about 100 lb/Mgal,
a thermal stabilizer comprising sodium erythorbate, wherein the thermal stabilizer is present in the gravel packing fluid in an amount of about 10 lb/Mgal to about 50 lb/Mgal,
a biocide comprising glutaraldehyde,
an iron control,
and
a gravel;
wherein the gravel packing fluid contains no other polysaccharide other than the single polysaccharide; wherein the gravel packing fluid comprising the thermal stabilizer reduces the percent of sand settling by at least 50% less than a gravel packing fluid without the thermal stabilizer in 30 minutes in a subterranean formation with a bottom hole static temperature of greater than 275° F.

13. The gravel packing fluid of claim 12, wherein the polysaccharide gelling agent comprises a polysaccharide gelling agent selected from the group consisting of diutan, succinoglycan, hydroxyethyl cellulose, and combinations thereof.

14. The gravel packing fluid of claim 12, wherein the gravel packing fluid further comprises an antioxidant stabilizer, and wherein the antioxidant stabilizer comprises a hydroxylamine.

15. The gravel packing fluid of claim 12, wherein the packing fluid has a viscosity of about 5 centipoise to about 1000 centipoise at a shear of 511 sec-1.

16. A gravel packing system comprising:
a gravel packing fluid comprising an aqueous base fluid, a single polysaccharide gelling agent, a thermal stabilizer comprising sodium erythorbate, a biocide comprising glutaraldehyde, an iron control, and a gravel;
a production tubing;
a screen coupled to the production tubing; and
a pumping system fluidically coupled to the production tubing, wherein the pumping system is capable of pumping the gravel packing fluid through the production tubing;
wherein the gravel packing fluid contains no other polysaccharide other than the single polysaccharide; wherein the gravel packing fluid comprising the thermal stabilizer reduces the percent of sand settling by at least 50% less than a gravel packing fluid without the thermal stabilizer in 30 minutes in a subterranean formation with a bottom hole static temperature of greater than 275° F.

17. The gravel packing system of claim 16, wherein the polysaccharide gelling agent comprises a polysaccharide gelling agent selected from the group consisting of diutan, succinoglycan, hydroxyethyl cellulose, and combinations thereof.

18. The gravel packing system of claim 16, wherein the gravel packing fluid further comprises an antioxidant stabilizer, and wherein the antioxidant stabilizer comprises a hydroxylamine.

19. The gravel packing system of claim 16, wherein the polysaccharide gelling agent is present in the gravel packing fluid in an amount of about 50 lb/Mgal to about 100 lb/Mgal.

20. The system of claim 16, wherein the gravel packing fluid has a viscosity of about 5 centipoise to about 1000 centipoise at a shear of 511 sec-1.

* * * * *